United States Patent [19]

Okabayashi et al.

[11] Patent Number: 5,049,365
[45] Date of Patent: Sep. 17, 1991

[54] PROCESS FOR TREATING AIR CONTAINING HYDROCARBON VAPOR WITH A COMPOSITE ADSORBENT MATERIAL

[75] Inventors: Seiji Okabayashi; Hirofumi Watanabe, both of Nakajo; Kiyoshi Abe; Masahide Ogawa, both of Shibata, all of Japan

[73] Assignee: Mizusawa Industrial Chemicals, Ltd., Tokyo, Japan

[21] Appl. No.: 486,861

[22] Filed: Mar. 1, 1990

Related U.S. Application Data

[62] Division of Ser. No. 299,332, Jan. 23, 1989, Pat. No. 4,963,519.

[30] Foreign Application Priority Data

May 23, 1988 [JP] Japan .................................. 63-123924

[51] Int. Cl.$^5$ ............................................. B01D 53/34
[52] U.S. Cl. ...................................... 423/245.1; 55/74
[58] Field of Search ................. 502/63, 413, 419, 417; 423/210, 245.1; 55/74

[56] References Cited

U.S. PATENT DOCUMENTS

| | | | |
|---|---|---|---|
| 3,862,026 | 1/1975 | Friend et al. .......................... | 585/820 |
| 3,960,771 | 6/1976 | Tanaka et al. ......................... | 502/80 |
| 4,499,208 | 2/1985 | Fuderer .................................. | 502/413 |
| 4,677,086 | 6/1987 | McCue et al. ......................... | 502/62 |
| 4,795,735 | 1/1989 | Liu et al. ............................... | 502/415 |
| 4,923,843 | 5/1990 | Saforo et al. .......................... | 502/415 |
| 4,963,519 | 10/1990 | Okabayashi et al. ................. | 502/63 |

FOREIGN PATENT DOCUMENTS

| | | | |
|---|---|---|---|
| 69146 | 4/1984 | Japan .................................... | 502/413 |
| 1204353 | 11/1967 | United Kingdom ................ | 502/415 |

*Primary Examiner*—Jeffrey E. Russel
*Attorney, Agent, or Firm*—Sherman & Shalloway

[57] ABSTRACT

Disclosed is a composite adsorbent consisting of a molded body of a homogeneous mixture comprising powdery active carbon and hydrous alumina of the pseudoboehmite type. This composite adsorbent has high mechanical strength and abrasion resistance. This composite adsorbent is excellent in the capacity of adsorbing organic components such as gasoline, and the desorption of the adsorbed components can be easily accomplished at a high desorption ratio. These excellent capacities are retained even if the adsorption-desorption cycle is repeated. Accordingly, this composite adsorbent is especially valuable as the adsorbent for an automobile canister.

7 Claims, 1 Drawing Sheet

PROCESS FOR TREATING AIR CONTAINING HYDROCARBON VAPOR WITH A COMPOSITE ADSORBENT MATERIAL

This is a division of application Ser. No. 07/299,332, filed Jan. 23, 1989, now U.S. Pat. No. 4,963,519.

BACKGROUND OF THE INVENTION

1. Field of the Invention

The present invention relates to a composite adsorbent consisting of a composite molded body of active carbon and hydrous alumina. More particularly, the present invention relates to a composite adsorbent which is excellent in the combination of the properties of absorbing and desorbing organic components such as gasoline.

2. Description of the Prior Art

Granular active carbon has been vigorously used for adsorbing various organic solvent vapors or various hydrocarbon vapors contained in air. This granular active carbon shows a high adsorbing capacity to organic components, but desorption of the adsorbed organic components is not satisfactorily easy. As the desorption means, there are adopted, for example, a method in which steam is passed through a packed layer of granular active carbon and a method in which a packed layer of granular active carbon is heated and a gas is passed through the heated packed layer.

However, if the adsorbent is heated for regeneration, there is a risk of combustion of the adsorbed component. Therefore, the desorption of the adsorbed component in ordinary air at room temperature is desired from the viewpoint of the operation efficiency and safety.

Moreover, granular active carbon is generally poor in the mechanical strength or abrasion resistance and there often arises a problem of dusting, and since granular active carbon has a black color, contamination of an apparatus or environment is often caused.

SUMMARY OF THE INVENTION

It is therefore a primary object of the present invention to provide a novel composite adsorbent which is excellent in the properties of adsorbing and desorbing organic components, especially in the effective desorption quantity, is capable of easily desorbing adsorbed components in air at room temperature and is prominently excellent in the mechanical strength and abrasion resistance.

Another object of the present invention is to provide a composite adsorbent which has a high pack density and hence, a large adsorption treatment quantity per unit volume and in which even when the adsorption-desorption cycle is repeated many times, the adsorbing and desorbing capacities are hardly reduced.

In accordance with one aspect of the present invention, there is provided a composite adsorbent which consists of a molded body of a homogeneous mixture comprising 30 to 70% by weight of powdery active carbon and 30 to 70% by weight of hydrous alumina of the pseudoboehmite type, and has a pack density of 500 to 700 g/l and an average pore radius of 13 to 20 Å.

In accordance with another aspect of the present invention, there is provided a composite adsorbent which consists of a molded body of a homogeneous mixture comprising 30 to 70% by weight of powdery active carbon, 5 to 70% by weight of hydrous alumina of the pseudoboehmite type and 5 to 60% by weight of a natural or synthetic smectite type clay mineral and has a pack density of 500 to 700 g/l and an average pore radius of 13 to 20 Å.

The composite adsorbent of the present invention is characterized in that it consists of a molded body of a homogeneous mixture of powdery active carbon and hydrous alumina of the pseudoboehmite type. The hydrous alumina of the pseudoboehmite type used in the present invention acts as an excellent excipient at the step of molding powdery active carbon, and at the heat treatment (calcination) of the molded body, the hydrous alumina gives a strong and dense molded body by the contraction of the hydrous alumina per se, and simultaneously, the hydrous alumina is converted to active alumina having an excellent adsorbing capacity.

This composite adsorbent has a smaller BET specific surface area and a smaller pore volume than granular active carbon, but the composite adsorbent shows such an excellent effective desorption quantity as 40% or more, though the effective desorption quantity of granular active carbon is only 20 to 30%. The fact that the composite adsorbent of the present invention shows an excellent effective desorption quantity was experimentally found, and the theoretical reason has not been sufficiently elucidated but it is presumed that the reason for attainment of the above-mentioned excellent effect is probably as follows.

The hydrous alumina of the pseudoboehmite type used in the present invention acts not only as a binder for powdery active carbon but also as an excellent adsorbent. The adsorbing capacity of the hydrous alumina to organic components is lower than that of active carbon but the adsorbing capacity to water is higher than that of active carbon. In the composite adsorbent of the present invention, it is believed that desorption of organic components is promoted by the adsorption of water contained in the desorption air by the hydrous alumina of the pseudoboehmite type. Furthermore, the average pore radius of the composite adsorbent per se is larger than that of powdery active carbon, and it is believed that this increased pore radius makes a contribution to increase of the effective desorption quantity of organic components. Moreover, the composite adsorbent has a large pack density, and it is believed that this increase of the pack density makes a contribution to increase of the adsorption quantity and desorption quantity per unit volume.

In the composite adsorbent of the present invention, powdery active carbon is present in an amount of 30 to 70% by weight, especially 40 to 60% by weight, and hydrous alumina of the pseudoboehmite type is present in an amount of 30 to 70% by weight, especially 40 to 60% by weight. If the amount of powdery active carbon is too small and below the above-mentioned range or the amount of the hydrous alumina exceeds the above-mentioned range, the effective desorption quantity is smaller than the effective desorption quantity attained in the present invention. If the amount of powdery active carbon exceeds the above-mentioned range or the amount of the hydrous alumina is below the above-mentioned range, reduction of the strength of the molded body or the effective desorption quantity is often caused.

The composite adsorbent of the present invention has a pack density of 400 to 700 g/l, especially 500 to 600 g/l, and an average pore radius of 13 to 20 Å, especially 14 to 18 Å. Namely, the composite adsorbent of the present invention is characterized in that the pack density is higher than the pack density of granular active carbon, which is generally in the range of from 350 to 500 g/l. Increase of the pack density is effective for increasing the effective desorption quantity per unit volume. Furthermore, the composite adsorbent of the present invention is characterized in that the average pore radius is larger than the average pore radius of granular active carbon, which is generally in the range of from 9 to 13 Å. It is presumed that this increase of the average pore radius results in increase of the effective desorption quantity.

Still further, the composite adsorbent of the present invention is excellent in the mechanical strength and abrasion resistance and has a crushing strength of at least 2 kg, especially at least 3 kg, as measured by a Kiya-type hardness meter. Accordingly, even if the adsorption-desorption cycle is repeated many times or under conditions where mechanical vibrations are applied, dusting is not caused and a composite adsorbent can be used stably for a long time. This is another characteristic of the composite adsorbent of the present invention.

If a natural or synthetic smectite clay mineral is added to the above-mentioned powdery active carbon and hydrous alumina of the psuedoboehmite type in an amount of 5 to 70% by weight, especially 10 to 40% by weight, based on the total mixture in the composite adsorbent of the present invention, the mechanical strength and abrasion resistance can be prominently improved without substantial degradation of the above-mentioned excellent adsorbing and desorbing capacities.

DETAILED DESCRIPTION OF THE PREFERRED EMBODIMENTS STARTING MATERIALS

Figure 1A:
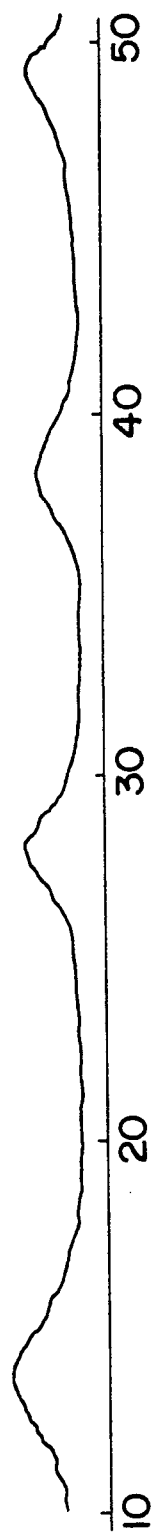
FIG. 1 shows X-ray diffraction patterns in which A indicates hydrous alumina of the pseudoboehmite type used in the present invention and B indicates the composite adsorbent obtained at Run No. 4 of Example 1.
Figure 1B:
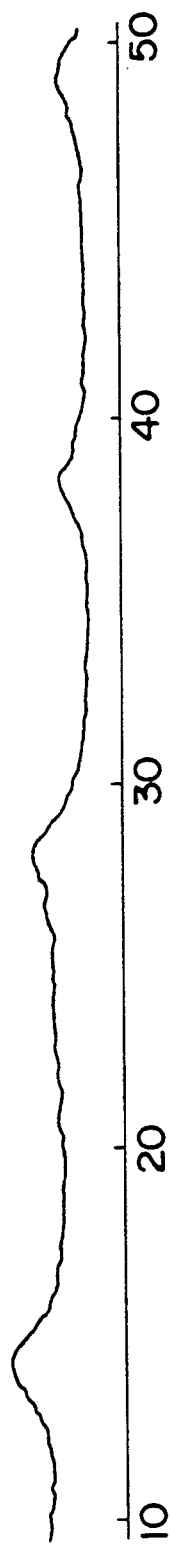

As pointed out hereinbefore, in the present invention, hydrous alumina of the psuedoboehmite type is used as the alumina adsorbent component. As the aluminum hydroxide or hydrous alumina, there are known gibbsite, bialite, boehmite, diaspore, and boehmite gel (pseudoboehmite). Among them, pseudoboehmite is used as the starting material in the present invention. In FIG. 1, A represents an X-ray diffraction pattern of hydrous alumina of the pseudoboehmite type.

The hydrous alumina used in the present invention has, in general, a particle size smaller than 5 μm, especially smaller than 3 μm, a BET specific surface area of 200 to 400 m$^2$/g and a pore volume of 0.2 to 0.6 ml/g, especially 0.3 to 0.5 ml/g. Hydrous alumina of the pseudoboehmite type is generally prepared by reacting sodium aluminate with a mineral acid such as sulfuric acid or by reacting an aluminum salt such as aluminum sulfate with an alkali such as caustic soda. Hydrous alumina prepared according to this known ordinary method, which satisfies the above-mentioned requirements, can be used in the present invention. Hydrous alumina which is advantageously used for attaining the objects of the present invention is disclosed in Japanese Patent Publication No. 13652/81 and is prepared according to the process disclosed in this patent publication. It is preferred that the hydrous alumina used as the starting material should have a composition represented by the following formula:

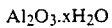

$$Al_2O_3 \cdot xH_2O$$

wherein x is a number of from 1.0 to 2.0, especially from 1.4 to 1.8.

Powdery active carbon used as the other starting material has preferably a particle size smaller than 10 μm, especially smaller than 8 μm, a BET specific surface area of at least 1000 m$^2$/g, especially at least 1200 m$^2$/g, and a pore volume of 0.8 to 1.5 ml/g, especially 1.0 to 1.3 ml/g. Powdery active carbon having an average pore radius of 12 to 20 Å, especially 14 to 18 Å, which is larger than that of ordinary active carbon, is advantageously used for attaining the objects of the present invention. The process for the preparation of active carbon is known. For example, powdery active carbon obtained by activating a starting material such as coconut husk by the chemical activation method using zinc chloride or the like is generally used.

As the natural or synthetic smectite type clay mineral optionally used as the third component, there can be mentioned dioctahedral smectites such as montmorillonite, beidellite and nontronite, and trioctahedral smectites such as saponite, hectorite, sauconite and stevensite. These smectite clay minerals have an adsorbing capacity, and they act as an inorganic binder and exert a function of improving the mechanical strength and abrasion resistance of the molded body. As preferred examples, there can be mentioned acid clay belonging to the montmorillonite group, activated acid clay, synthetic lamellar magnesium phyllosilicate disclosed in Japanese Patent Application Laid-Open Specification No. 10020/86, synthetic fraipontite disclosed in Japanese Patent Application Laid-Open Specification No. 10021/76, active bentonite disclosed in Japanese Patent Application Laid-Open Specification No. 50310/88 and synthetic stevensite disclosed in Japanese Patent Application No. 20476/87. The clay mineral used in the present invention has preferably a particle size smaller than 10 μm, especially smaller than 3 μm, and a BET specific surface area of 200 to 600 m$^2$/g, especially 200 to 500 m$^2$/g.

COMPOSITE ADSORBENT AND PREPARATION PROCESS

According to the present invention, the above-mentioned starting materials are dry- or wet-mixed at the above-mentioned ratio so that the entire mixture becomes homogeneous. The mixture is kneaded in the presence of water for the homogenization and the kneaded mixture is molded into a predetermined shape. At the step of preparing the kneaded composition for molding, it is preferred that water be present in an amount of 30 to 60% by weight, especially 40 to 50% by weight, based on the solids, though the preferred amount of water differs to some extent according to the bulk specific gravity of the powder. A kneader, a super mixer or a single-screw or twin-screw extruder can be used for the kneading operation, and if necessary, a vacuum type soil kneader can be used.

A pelletizer, a tablet machine or the like can be used for molding the kneaded mixture into granules, and the rolling granulation method can be used for formation of spheres. The shape of the molded body is not particularly critical, and any of spherical, cylindrical, tablet-like, annular and honeycomb shapes can be optionally adopted. The particle size can be selected within a broad range of, for example, 0.3 mm to 5 mm. In order to impart a shape-retaining property to the kneaded composition, a known organic binder such as carboxymethyl cellulose, ethyl cellulose, polyvinyl alcohol, starch, cyanoethylated starch, tragacanth gum or a latex of a synthetic resin or synthetic rubber can be incorporated in the composition in an amount of 0.1 to 3% by weight based on the solids.

According to the present invention, the so-obtained molded body is heat-treated so that densification and enhancement of the strength can be attained by the firing contraction. The heat treatment is conducted at a temperature of 100° to 600° C., especially 150° to 350° C., for 60 to 360 minutes, especially 120 to 240 minutes.

The composite adsorbent of the present invention has a BET specific surface area of 600 to 1200 m²/g, especially 700 to 1000 m²/g, and a pore volume of 0.5 to 1.0 ml/g, especially 0.6 to 0.8 ml/g. In general, the composite adsorbent has an adsorption capacity of 13 to 20 g/ml to an aliphatic hydrocarbon solvent, and the effective desorption quantity is at least 30%, especially at least 40%.

The composite adsorbent of the present invention is widely used for removing and recovering organic solvent vapors, hydrocarbon vapors, flon type halogenated hydrocarbons and the like from various atmospheres, and is also used for removing smell components and coloring components from various solutions and dispersions by the adsorption.

The composite adsorbent of the present invention consists of a molded body of a homogeneous mixture of powdery active carbon and hydrous alumina of the pseudoboehmite type, and the above-mentioned third component is optionally incorporated. The composite adsorbent of the present invention is excellent in the combination of the adsorbing and desorbing capacities to organic components to be adsorbed, for example, gasoline and especially excellent in the effective desorption quantity. Furthermore, the desorption of adsorbed components can be easily accomplished in air at room temperature, and the composite adsorbent is prominently excellent in the mechanical strength and abrasion resistance. Still further, the composite adsorbent has a high pack density and hence, the adsorption treatment quantity per unit volume is very large. Moreover, the composite adsorbent is advantageous in that even if the adsorption-desorption cycle is repeated many times, the adsorbing and desorbing capacities are hardly reduced.

The present invention will now be described in detail with reference to the following examples that by no means limit the scope of the invention.

REFERENTIAL EXAMPLE 1

Hydrous alumina of the pseudoboehmite type (hereinafter referred to as "hydrous alumina") was prepared according to the process described below.

A slightly acidic (pH=2 to 3) aqueous solution of aluminum nitrate having a concentration of 50 to 100 g/l as $Al_2O_3$ was poured at a speed of 100 to 1000 ml/min into a slurry containing calcium carbonate at a concentration of 70 to 300 g/l (hereinafter referred to as "calcium carbonate slurry"), which was heated and stirred at 70° to 120° C., and after completion of addition of the calcium carbonate slurry, the aging treatment was carried out with gentle stirring for about 1 hour at a temperature lower than 90° C. so that the pH value of the reaction slurry was maintained at 6 to 8, whereby hydrous alumina was obtained.

The obtained hydrous alumina was recovered by filtration, washed with water and dried at a temperature of 110° to 150° C. to obtain a fine powder of hydrous alumina to be used in the present invention. The properties of the obtained fine powder are shown in Table 1.

TABLE 1

| Sample No. | A-1 | A-2 | A-3 | A-4 | A-5 |
|---|---|---|---|---|---|
| Bulk Density (g/ml) | 0.32 | 0.52 | 0.45 | 0.42 | 0.39 |
| Average Particle Size (μm) | 2.6 | 3.5 | 2.8 | 3.2 | 3.2 |
| Specific Surface Area (m²/g) | 310 | 250 | 294 | 286 | 302 |
| Pore Volume (ml/g) | 0.412 | 0.352 | 0.380 | 0.373 | 0.384 |
| Average Pore Diameter (Å) | 26.6 | 28.2 | 25.9 | 26.1 | 25.4 |

REFERENTIAL EXAMPLE 2

Commercially available products (supplied by Taiheiyo Kinzoku and Takeda Yakuhin Kogyo) having properties shown in Table 2 were used as the powdery active carbon according to the resent invention.

TABLE 2

| Sample No. | B-1 | B-2 | B-3 | B-4 |
|---|---|---|---|---|
| Bulk Density (g/ml) | 0.26 | 0.19 | 0.21 | 0.24 |
| Average Particle Size (μm) | 8.4 | 7.2 | 8.3 | 8.4 |
| Specific Surface Area (m²/g) | 1200 | 1360 | 1290 | 1390 |
| Pore Volume (ml/g) | 0.87 | 1.05 | 0.99 | 1.45 |
| Average Pore Radius (Å) | 14.5 | 15.4 | 15.3 | 1.59 |

REFERENTIAL EXAMPLE 3

Natural or synthetic smectite clay minerals having binder characteristics, the properties of which are shown in Table 3, were used as the third component according to the present invention.

TABLE 3

| Sample No. | C-1 | C-2 | C-3 | C-4 |
|---|---|---|---|---|
| Clay Mineral | acid clay | synthetic lamellar magnesium phyllosilicate | synthetic hectorite | synthetic stevensite |
| Bulk Density (g/ml) | 0.82 | 0.23 | 0.86 | 0.88 |
| Average Particle Size (μm) | 5 | 3 | 0.01 | 0.01 |
| Specific Surface Area (m²/g) | 200 | 490 | 510 | 496 |
| Pore Volume (ml/g) | 0.30 | 0.33 | 0.35 | 0.30 |
| Average Pore Radius (Å) | 30 | 13.5 | 13.7 | 14.1 |

EXAMPLE 1

The starting materials shown in Tables 1, 2 and 3 were dried at 150° C. for 6 hours and mixed at a ratio shown in Table 4.

Then, the mixture was kneaded for 1 hour by a kneader while adjusting the water content to 2% by weight by drying at 150° C., and the kneaded mixture was extruded into columns having a diameter of 1.5 mm by a pelletizer (supplied by Fuji Powder).

The extruder was dried at 150° C. for 20 hours and heat-treated at 300° C. for 3 hours in air to obtain a composite adsorbent of the present invention. The properties were determined according to the following test methods. The obtained results are shown in Table 4.

Incidentally, Run Nos. 1 and 2 in Table 4 are comparative runs.

TEST METHODS

The properties referred to in the instant specification were determined according to the following test methods.

1. X-Ray Diffractometry

The X-ray diffractometry was carried out by using an X-ray diffraction apparatus supplied by Rigaku Denki (X-ray generator 4036A1, goniometer 2125D1, counter 5071) under the following conditions.
Target: Cu
Filter: Ni
Detector: SC
Voltage: 35 kV
Current: 15 mA
Full-Scale of Counting: 8000 c/s
Time Constant: 1 sec
Scanning Speed: 2°/mm
Chart Speed: 2 cm/mm
Radiation Angle: 1°
Slit Width: 0.3 mm 2. BET Specific Surface Area (SA)

The BET specific surface area was determined by using an automatic BET measuring apparatus (Sporptomatic Series 1800 supplied by Carlo-Erba).

3. Pore Volume (PV)

By using the above-mentioned BET measurement apparatus, the sample was deaerated at 250° C. under $10^{-2}$ mmHg, and the $N_2$ adsorption quantity (V1) in the normal state was calculated from the $N_2$ adsorption quantity at the liquefied $N_2$ saturation temperature under an $N_2$ pressure of 735 mmHg and the pore volume was calculated according to the following formula:

Pore volume $(PV) = V1 \times 1.555 \times 10^{-3}$ (ml/g)

4. Average Pore Radius ($\bar{r}$)

Supposing that pores had a cylindrical shape, the average pore radius was calculated according to the following formula:

Average pore radius $(r) = \frac{2 \times \text{pore volume }(BV)}{BET \text{ specific surface Area }(SA)} \times 10^4$ (Å)

5. Pack Density (BD)

A predetermined weight (W g) of a sample dried at 150° C. for 3 hours was charged in a graduated cylinder having a capacity of 500 ml and sufficiently rammed into the cylinder, and the packed volume (V ml) of the sample was measured. The pack density (BD) was measured according to the following formula:

Pack density $(BD) = (W/V) \times 100$ (g/l)

6. Particle Strength

The crushing strength was measured by using a Kiya-type hardness meter (10 kg meter) with respect to 20 columnar samples (1.5 mm in diameter and 3 mm in length) dried at 150° C. for 2 hours, and the mean value was calculated and expressed as the particle strength.

7. Abrasion Resistance

A glass vessel (45 mm in diameter and 75 mm in height) set at a shaker (Model 5410 supplied by Red Devil) was charged with 40 g of a sample which had been used for the moisture-adsorbing treatment for 48 hours at a relative humidity of 75%, and the sample was shaken for 30 minutes and classified by using a 32-mesh sieve. The weight (W1, g) of the fraction passing through the sieve was measured and the abrasion resistance ratio was calculated according to the following formula:

Abrasion resistance ratio $= [(40 - W1)/40] \times 100$ (%)

8. Average Particle Size

The average particle size was the particle size at the point of 50% volume distribution in the accumulated particle size curve obtained according to the Coulter Counter method (Coulter Counter Model TA-II).

TABLE 4

| Run No. | Composition (parts by weight) of Adsorbent | | | Pack Density (g/l) | Specific Surface Area (m²/g) | Pore Volume (ml/g) | Average Pore Radius (Å) | Particle Strength (kg) | Abrasion Resistance Ratio (%) |
|---|---|---|---|---|---|---|---|---|---|
| | B | A | C | | | | | | |
| | B-2 | A-1 | — | | | | | | |
| 1 | 100 | 0 | 0 | 280 | 1380 | 1.1 | 15.9 | <0.1 | 2.0 |
| 2 | 80 | 20 | 0 | 440 | 1174 | 0.97 | 16.5 | 1.2 | 99.0 |
| 3 | 70 | 30 | 0 | 506 | 1080 | 0.90 | 16.7 | 2.1 | 99.6 |
| 4 | 60 | 40 | 0 | 540 | 975 | 0.82 | 16.8 | 2.8 | 99.8 |
| 5 | 50 | 50 | 0 | 560 | 860 | 0.73 | 17.0 | 3.4 | 99.9 |
| 6 | 30 | 70 | 0 | 600 | 612 | 0.56 | 18.3 | 4.6 | 100 |
| 7 | 20 | 80 | 0 | 632 | 513 | 0.51 | 19.9 | 5.5 | 100 |
| | B-1 | A-1 | C-1 | | | | | | |
| 8 | 65 | 25 | 5 | 512 | 943 | 0.72 | 15.3 | 2.1 | 99.8 |
| 9 | 70 | 10 | 20 | 505 | 939 | 0.71 | 15.1 | 2.2 | 99.8 |
| 10 | 60 | 30 | 10 | 517 | 853 | 0.67 | 15.7 | 2.9 | 99.9 |
| 11 | 30 | 60 | 10 | 640 | 569 | 0.56 | 19.7 | 4.6 | 100 |
| 12 | 30 | 50 | 20 | 632 | 557 | 0.55 | 19.7 | 4.6 | 100 |
| | B-2 | A-2 | C-1 | | | | | | |
| 13 | 30 | 40 | 30 | 628 | 546 | 0.54 | 19.8 | 4.8 | 99.9 |
| 14 | 30 | 30 | 40 | 620 | 536 | 0.53 | 19.8 | 4.4 | 99.9 |
| 15 | 30 | 20 | 50 | 614 | 523 | 0.52 | 19.9 | 4.2 | 99.9 |
| 16 | 30 | 10 | 60 | 609 | 512 | 0.52 | 20.3 | 4.0 | 99.8 |
| 17 | 30 | 5 | 65 | 596 | 508 | 0.51 | 20.1 | 4.0 | 99.8 |

TABLE 4-continued

| Run No. | Composition (parts by weight) of Adsorbent B | A | C | Pack Density (g/l) | Specific Surface Area (m²/g) | Pore Volume (ml/g) | Average Pore Radius (Å) | Particle Strength (kg) | Abrasion Resistance Ratio (%) |
|---|---|---|---|---|---|---|---|---|---|
| | B-2 | A-1 | C-2 | | | | | | |
| 18 | 70 | 20 | 10 | 508 | 970 | 0.73 | 15.1 | 2.2 | 99.7 |
| 19 | 70 | 10 | 20 | 503 | 997 | 0.72 | 14.4 | 2.1 | 99.7 |
| 20 | 60 | 30 | 10 | 517 | 908 | 0.65 | 14.3 | 2.5 | 99.9 |
| 21 | 30 | 60 | 10 | 632 | 604 | 0.55 | 18.2 | 4.5 | 100 |
| 22 | 30 | 10 | 60 | 506 | 695 | 0.53 | 15.3 | 2.5 | 99.8 |
| 23 | 30 | 5 | 65 | 480 | 719 | 0.52 | 14.5 | 2.0 | 99.8 |
| | B-1 | A-3 | C-3 | | | | | | |
| 24 | 70 | 20 | 10 | 526 | 953 | 0.70 | 14.7 | 2.3 | 99.8 |
| 25 | 70 | 10 | 20 | 530 | 941 | 0.68 | 14.5 | 2.3 | 99.7 |
| 26 | 60 | 30 | 10 | 565 | 868 | 0.65 | 15.0 | 2.5 | 99.9 |
| | B-3 | A-5 | C-3 | | | | | | |
| 27 | 30 | 60 | 10 | 654 | 574 | 0.57 | 19.9 | 4.8 | 100 |
| 28 | 30 | 10 | 60 | 596 | 551 | 0.53 | 19.2 | 4.5 | 99.9 |
| 29 | 35 | 5 | 60 | 570 | 529 | 0.51 | 19.3 | 4.8 | 99.9 |
| | B-2 | A-2 | C-4 | | | | | | |
| 30 | 70 | 20 | 10 | 594 | 945 | 0.72 | 15.2 | 3.0 | 99.8 |
| 31 | 70 | 10 | 20 | 605 | 940 | 0.71 | 15.1 | 3.3 | 99.9 |
| 32 | 60 | 30 | 10 | 620 | 856 | 0.65 | 15.2 | 2.8 | 100 |
| | B-4 | A-4 | C-4 | | | | | | |
| 33 | 30 | 60 | 10 | 672 | 569 | 0.52 | 18.3 | 4.8 | 100 |
| 34 | 30 | 10 | 60 | 683 | 520 | 0.50 | 19.2 | 5.1 | 100 |
| 35 | 30 | 5 | 65 | 689 | 512 | 0.47 | 18.4 | 5.2 | 100 |

EXAMPLE 2

With respect to some of the composite adsorbents obtained in Example 1, the adsorption-desorption of organic components was examined, and the durability of this adsorption-desorption effect was evaluated by the cycle test. The obtained results are shown in Table 5.

More specifically, with respect to each of the composite adsorbents obtained at Run Nos. 4, 10, 20, 21, 26 and 32 of Example 1, 100 ml of the sample was charged in a beaker and the beaker was placed in a desiccator charged with an organic solvent shown in Table 5, and the saturated vapor of the organic sorbent was adsorbed in the sample. Then, the adsorbent was packed in a column (2.5 cm in diameter and 2.5 cm in length) and air having a relative humidity of 50% or 80% was circulated through the column at a flow rate of 500 ml/min for 25 minutes to desorb the adsorbed organic solvent. In some of these samples, this adsorption-desorption cycle test was repeated 20 times, and the adsorption quantity and desorption quantity at the 20th cycle were measured. The obtained results are shown in Table 5.

For comparison, the above test was carried out in the same manner as described above by using the active carbon component alone.

TABLE 5

| Organic Solvent | Desorption Condition (relative humidity %) | Adsorbent | Adsorption-Desorption Effect Active Carbon B-1 | B-2 | Composite Adsorbent No. 4 | No. 10 | No. 20 | No. 26 | No. 32 | Effect at Adsorption-Desorption Effect Composite Adsorbent No. 20 | No. 21 | Active Carbon B-2 |
|---|---|---|---|---|---|---|---|---|---|---|---|---|
| ethyl acetate | | adsorption quantity (g/100 cc) | 13.9 | 15.7 | 29.6 | 21.7 | 26.3 | 25.6 | 26.9 | 26.1 | 28.5 | 12.9 |
| | 80 | desorption quantity (g/100 cc) | 3.98 | 4.62 | 12.82 | 9.31 | 12.22 | 10.85 | 11.30 | 12.93 | 11.40 | 3.72 |
| | | desorption ratio (%) | 28.6 | 29.4 | 43.3 | 42.9 | 46.5 | 42.4 | 42.0 | 49.5 | 40.0 | 28.8 |
| | 50 | desorption quantity (g/100 cc) | 4.25 | 4.89 | 12.92 | 9.42 | 12.35 | 11.00 | 11.52 | 12.89 | 12.15 | 4.15 |
| | | desorption ratio (%) | 30.6 | 31.1 | 43.6 | 43.4 | 46.9 | 42.9 | 42.8 | 49.4 | 42.6 | 32.2 |
| vinyl acetate | | adsorption quantity (g/100 cc) | 19.3 | 15.95 | 30.64 | 22.69 | 27.28 | 26.70 | 28.06 | | | |
| | 80 | desorption quantity (g/100 cc) | 5.49 | 4.63 | 13.18 | 9.71 | 12.69 | 11.35 | 11.95 | | | |
| | | desorption ratio (%) | 28.5 | 29.0 | 43.0 | 42.8 | 46.5 | 42.5 | 42.6 | | | |
| | 50 | desorption quantity (g/100 cc) | 6.25 | 5.15 | 13.25 | 10.1 | 12.82 | 11.42 | 12.1 | | | |
| | | desorption ratio (%) | 32.4 | 32.3 | 43.2 | 44.5 | 47.0 | 42.8 | 43.1 | | | |

TABLE 5-continued

| Organic Solvent | Desorption Condition (relative humidity %) | Adsorbent | Adsorption-Desorption Effect | | | | | | | Effect at Adsorption-Desorption Effect | | |
|---|---|---|---|---|---|---|---|---|---|---|---|---|
| | | | Active Carbon | | Composite Adsorbent | | | | | Composite Adsorbent | | Active Carbon |
| | | | B-1 | B-2 | No. 4 | No. 10 | No. 20 | No. 26 | No. 32 | No. 20 | No. 21 | B-2 |
| n-hexane | | adsorption quantity (g/100 cc) | 16.25 | 13.25 | 25.28 | 18.09 | 21.60 | 20.19 | 21.81 | 22.10 | 23.50 | 12.35 |
| | 80 | desorption quantity (g/100 cc) | 4.55 | 3.76 | 10.82 | 7.69 | 9.63 | 8.48 | 9.23 | 9.86 | 8.84 | 2.48 |
| | | desorption ratio (%) | 28.0 | 28.4 | 42.8 | 42.5 | 44.6 | 42.0 | 42.3 | 44.6 | 37.6 | 20.0 |
| | 50 | desorption quantity (g/300 cc) | 4.88 | 4.2 | 10.95 | 7.70 | 9.81 | 8.51 | 9.37 | 10.15 | 9.35 | 3.76 |
| | | desorption ratio (%) | 30.0 | 31.7 | 43.3 | 42.6 | 45.4 | 42.1 | 43.0 | 45.9 | 39.8 | 30.4 |

EXAMPLE 3

The composite absorbent obtained at Run No. 20 of Example 1 was subjected to the following adsorption-desorption cycle test by using commercially available gasoline having an octane number (motor octane number) of 82.5 (80 EM Gasoline supplied by Nippon Sekiyu).

Gasoline mixed with air fed at a flow rate of 1.6 l/min, which was heated at 65° C., was passed through a layer packed with 300 ml of the molded body of the composite adsorbent prepared at Run No. 20 of Example 1, and when 2 g of the gasoline had been passed through the packed layer, the adsorption quantity was determined from the weight increase in the composite adsorbent.

Then, air having a relative humidity shown in Table 6 was passed through the packed layer at a flow rate of 5.3 l/min, and the desorption quantity was determined from the weight decrease in the composite adsorbent. This adsorption-desorption cycle test was repeated 20 times. After the 20th cycle, the desorption ratio (effective desorption ratio) was calculated according to the following formula:

Desorption ratio = [(desorption quantity)/(desorption quantity + accumulated residual gasoline quantity)] × 100

For comparison, the above test was carried out in the same manner by using a commercially available active carbon molded body (Run No. 3H-1).

The obtained results are shown in Table 6.

TABLE 6

| | Run No. 3-1 desorption condition: relative humidity = 75% | | | Run No. 3-2 desorption condition: relative humidity = 65% | | |
|---|---|---|---|---|---|---|
| cycle number | adsorption quantity (g/300 cc) | desorption quantity (g/300 cc) | residual gasoline quantity (g/300 cc) * | adsorption quantity (g/300 cc) | desorption quantity (g/300 cc) | residual gasoline quantity (g/300 cc) * |
| 1 | 28.3 | 16.6 | 11.7 11.7 | 26.5 | 15.6 | 10.9 10.9 |
| 2 | 23.0 | 19.0 | 4.0 15.7 | 21.6 | 18.1 | 3.5 14.4 |
| 3 | 22.8 | 19.7 | 3.1 18.8 | 21.7 | 19.2 | 2.5 16.9 |
| 4 | 22.3 | 20.2 | 2.1 20.9 | 21.2 | 19.4 | 1.8 18.7 |
| 5 | 22.4 | 20.4 | 2.0 22.9 | 21.0 | 19.5 | 1.5 20.2 |
| 6 | 22.2 | 20.5 | 1.7 24.6 | 21.0 | 19.6 | 1.4 21.6 |
| 7 | 22.2 | 20.9 | 1.3 25.9 | 21.1 | 19.9 | 1.2 22.8 |
| 8 | 22.5 | 21.4 | 1.1 27.0 | 21.2 | 20.0 | 1.2 24.0 |
| 9 | 22.8 | 21.3 | 1.5 28.5 | 21.2 | 20.1 | 1.1 25.1 |
| 10 | 23.3 | 21.9 | 1.4 29.9 | 21.3 | 20.3 | 1.0 26.1 |
| 11 | 22.8 | 22.1 | 0.7 30.6 | 21.3 | 20.3 | 1.0 27.1 |
| 12 | 22.8 | 22.4 | 0.4 31.0 | 21.0 | 20.4 | 0.6 27.7 |
| 13 | 22.8 | 22.4 | 0.4 31.4 | 21.5 | 20.6 | 0.9 28.6 |
| 14 | 22.9 | 22.5 | 0.4 31.8 | 21.3 | 20.8 | 0.5 29.1 |
| 15 | 23.1 | 22.6 | 0.5 32.3 | 21.5 | 21.0 | 0.5 29.6 |
| 16 | 23.0 | 22.6 | 0.4 32.7 | 21.6 | 21.2 | 0.4 30.0 |
| 17 | 23.1 | 22.6 | 0.5 33.2 | 21.8 | 21.3 | 0.5 30.5 |
| 18 | 23.2 | 22.7 | 0.5 33.7 | 22.2 | 21.6 | 0.6 31.1 |
| 19 | 23.2 | 22.7 | 0.5 34.2 | 22.0 | 21.5 | 0.5 31.6 |
| 20 | 23.0 | 22.7 | 0.3 34.5 | 22.1 | 21.6 | 0.5 32.1 |
| | desorption rate = 39.5% | | | desorption rate = 40.0% | | |

| | Run No. 3-3 desorption condition: relative humidity = 80% | | | Run No. 3H-1 desorption condition: relative humidity = 65% | | |
|---|---|---|---|---|---|---|
| cycle number | adsorption quantity (g/300 cc) | desorption quantity (g/300 cc) | residual gasoline quantity (g/300 cc) * | adsorption quantity (g/300 cc) | desorption quantity (g/300 cc) | residual gasoline quantity (g/300 cc) * |

TABLE 6-continued

| | | | | | | | | |
|---|---|---|---|---|---|---|---|---|
| 1 | 25.7 | 14.0 | 11.7 | 11.7 | 31.5 | 11.6 | 19.9 | 19.9 |
| 2 | 20.0 | 16.5 | 3.5 | 15.2 | 21.4 | 16.4 | 5.0 | 24.9 |
| 3 | 19.7 | 16.7 | 3.0 | 18.2 | 19.8 | 17.4 | 2.4 | 27.3 |
| 4 | 20.0 | 17.4 | 2.6 | 20.8 | 19.6 | 18.1 | 1.6 | 28.9 |
| 5 | 19.6 | 17.7 | 1.9 | 22.7 | 19.1 | 18.0 | 1.1 | 30.0 |
| 6 | 20.0 | 18.2 | 1.8 | 24.5 | 19.1 | 18.1 | 1.0 | 31.0 |
| 7 | 20.3 | 18.4 | 1.9 | 26.4 | 19.1 | 18.0 | 1.1 | 32.1 |
| 8 | 19.9 | 18.7 | 1.2 | 27.6 | 18.8 | 18.1 | 0.7 | 32.8 |
| 9 | 20.6 | 19.4 | 1.2 | 28.8 | 19.5 | 18.3 | 1.2 | 34.0 |
| 10 | 20.2 | 19.1 | 1.1 | 29.9 | 19.5 | 18.4 | 1.1 | 35.1 |
| 11 | 19.9 | 19.1 | 0.8 | 30.7 | 19.5 | 18.3 | 1.2 | 36.3 |
| 12 | 19.9 | 19.0 | 0.9 | 31.6 | 19.2 | 18.2 | 1.0 | 37.3 |
| 13 | 20.1 | 19.1 | 1.0 | 32.6 | 19.0 | 18.2 | 0.8 | 38.1 |
| 14 | 20.0 | 19.9 | 0.1 | 32.7 | 19.1 | 18.3 | 0.8 | 38.9 |
| 15 | 20.4 | 20.0 | 0.4 | 33.1 | 19.2 | 18.2 | 1.0 | 39.9 |
| 16 | 20.5 | 20.3 | 0.2 | 33.3 | 19.2 | 18.1 | 1.1 | 41.0 |
| 17 | 20.7 | 20.2 | 0.5 | 33.8 | 19.2 | 18.1 | 1.1 | 42.1 |
| 18 | 20.6 | 20.3 | 0.3 | 34.1 | 19.2 | 18.0 | 1.2 | 43.3 |
| 19 | 20.6 | 20.3 | 0.3 | 34.4 | 19.2 | 18.0 | 1.2 | 44.5 |
| 20 | 20.5 | 20.3 | 0.2 | 34.6 | 19.2 | 18.0 | 1.2 | 45.7 |
| | desorption ratio = 36.9% | | | | | desorption ratio = 28.3% | | | note: *accumulated residual gasoline quantity

We claim:

1. In a process for treating air containing hydrocarbon vapor which comprises passing the air containing the hydrocarbon vapor through a packed layer of an adsorbent to adsorb the hydrocarbon vapor into the adsorbent and passing an air free of hydrocarbon through the packed layer of the hydrocarbon-adsorbed adsorbent to cause desorption of the adsorbed hydrocarbon, the improvement wherein said adsorbent comprises a granular composition comprising 30 to 70% by weight of powdery active carbon and 30 to 70% by weight of pseudoboehmite hydrous alumina and having a pack density of 500 to 700 g/l and an average pore radius of 13 to 20 Å.

2. The process of claim 1 wherein the granular composition comprises 40 to 60% by weight of the powdery active carbon and 40 to 60% by weight of the pseudoboehmite hydrous alumina.

3. In a process for treating an air containing hydrocarbon vapor which comprises passing the air containing the hydrocarbon vapor through a packed layer of an adsorbent to adsorb the hydrocarbon into the adsorbent and passing an air free of hydrocarbon through the packed layer of the hydrocarbon-adsorbed adsorbent to cause desorption of the adsorbed hydrocarbon, the improvement wherein said adsorbent comprises a granular composition comprising 30 to 70% by weight of powdery active carbon, 5 to 60% by weight of pseudoboehmite hydrous alumina, and 5 to 60% by weight of natural or synthetic smectite clay mineral, and having a pack density of 500 to 700 g/l and an average pore radius of 13 to 20 Å.

4. A process for removing hydrocarbon vapor from air which comprises at least one cycle of adsorbing the hydrocarbon vapor by passing the hydrocarbon vapor containing air through a packed layer of the adsorbent and desorbing the adsorbed hydrocarbon from the adsorbent by passing air free of hydrocarbon through the packed layer of the adsorbent having hydrocarbon adsorbed therein, said adsorbent comprising a molded body of a homogeneous mixture comprising from 30 to 70% by weight of powdery active carbon and 30 to 70% by weight of pseudoboehmite hydrous alumina, said adsorbent having a pack density of 500 to 700 g/l and an average pore radius of 13 to 20 Å.

5. The process of claim 1 wherein said adsorbent has a BET specific surface area of from 500 to 1200 $m^2/g$ and a pore volume of 0.4 to 1.0 ml/g.

6. The process of claim 5 wherein the powdery active carbon has a particle size smaller than 10 μm, a specific surface area of at least 1000 $m^2/g$ and a pore volume of 0.8 to 1.5 ml/g.

7. The process of claim 6 wherein the hydrous alumina has a particle size smaller than 5 μm, a BET specific surface area of 200 to 400 $m^2/g$ and a pore volume of 0.3 to 0.6 ml/g.

* * * * *